(12) United States Patent
Peng

(10) Patent No.: US 8,139,464 B2
(45) Date of Patent: Mar. 20, 2012

(54) PLANAR OPTICAL WAVEGUIDE FOR HEAT ASSISTED MAGNETIC RECORDING

(75) Inventor: Chubing Peng, Allison Park, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 429 days.

(21) Appl. No.: 11/901,921

(22) Filed: Sep. 19, 2007

(65) Prior Publication Data

US 2009/0073843 A1   Mar. 19, 2009

(51) Int. Cl.
*G11B 7/00* (2006.01)

(52) U.S. Cl. .................................. 369/112.27

(58) Field of Classification Search ............ 369/94, 369/13.33, 13.32, 13.24, 112.27, 112.09, 369/275.1, 13.11, 283; 360/59, 313, 245.3
See application file for complete search history.

(56) References Cited

U.S. PATENT DOCUMENTS

| | | | |
|---|---|---|---|
| 4,932,743 A * | 6/1990 | Isobe et al. ...................... 385/14 |
| 6,064,642 A * | 5/2000 | Okubo ........................ 369/275.1 |
| 6,795,630 B2 * | 9/2004 | Challener et al. .............. 385/129 |
| 6,944,112 B2 * | 9/2005 | Challener ................. 369/112.27 |
| 7,042,810 B2 | 5/2006 | Akiyama et al. |
| 7,106,935 B2 * | 9/2006 | Challener ...................... 385/129 |
| 7,151,738 B2 * | 12/2006 | Peng ........................ 369/112.27 |
| 7,171,080 B2 | 1/2007 | Rausch |
| 7,412,143 B2 * | 8/2008 | Rottmayer et al. ............ 385/129 |
| 2002/0024913 A1 * | 2/2002 | Kojima et al. ................... 369/94 |
| 2003/0128634 A1 * | 7/2003 | Challener .................. 369/13.33 |
| 2003/0138669 A1 * | 7/2003 | Kojima et al. .......... 428/694 ST |
| 2004/0001420 A1 * | 1/2004 | Challener ................. 369/112.27 |
| 2004/0062503 A1 * | 4/2004 | Challener ...................... 385/129 |
| 2005/0111309 A1 * | 5/2005 | Peng .......................... 369/13.11 |
| 2005/0135008 A1 | 6/2005 | Challener et al. |
| 2005/0157630 A1 * | 7/2005 | Yeh et al. .................... 369/275.2 |
| 2006/0280103 A1 | 12/2006 | Tawa |
| 2007/0115787 A1 | 5/2007 | Itagi et al. |
| 2007/0165495 A1 * | 7/2007 | Lee et al. .................... 369/13.33 |

* cited by examiner

*Primary Examiner* — Ali Neyzari
(74) *Attorney, Agent, or Firm* — Hollinsworth & Funk, LLC

(57) ABSTRACT

An optical waveguide includes a core guiding layer, a cladding layer adjacent to the core guiding layer, a reflective layer, and a multiple layer stack on the reflective layer. The multiple layer stack includes a periodic arrangement of dielectric bilayers that each include a first dielectric layer and a second dielectric layer. An index of refraction $n_1$ of the first dielectric layer is greater than an index of refraction $n_2$ the second dielectric layer.

19 Claims, 3 Drawing Sheets

PLANAR OPTICAL WAVEGUIDE FOR HEAT ASSISTED MAGNETIC RECORDING

FIELD OF THE INVENTION

The present invention relates to optical waveguides. More particularly, the present invention relates to optical waveguides that can be used in optical recording and thermal assisted magnetic recording.

BACKGROUND

As areal densities increase, smaller bit cells are required in the magnetic medium (track width and bit length). However, superparamagnetic instabilities become an issue as the grain volume (i.e., the number of grains in the media per bit cell) of the recording medium is reduced in order to control media noise for high areal density recording. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is absolute temperature. When this inequality is not satisfied, thermal energy demagnetizes the stored bits. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, with available materials the recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium.

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. HAMR allows for the use of small grain media, which is desirable for recording at increased areal densities, with a larger magnetic anisotropy at room temperature to assure sufficient thermal stability. HAMR can be applied to any type of magnetic storage media, including tilted media, longitudinal media, perpendicular media and patterned media. By heating the medium, the $K_u$, or the coercivity is reduced such that the magnetic write field is sufficient to write to the medium. Once the medium cools to ambient temperature, the medium has a sufficiently high value of coercivity to assure thermal stability of the recorded information.

In some implementations of HAMR, a large amount of optical energy is delivered to the recording medium and confined to spots of, for example, 50 nm or less. Recent designs of HAMR recording heads include a thin film waveguide on an AlTiC slider to guide light to a storage medium for localized heating of the storage medium. To launch light into the waveguide, a grating coupler can be used. Due to the limited size of the slider, the size of the incident beam is only about 50 µm. At this beam size and with conventional symmetric surface-corrugation grating couplers, coupling efficiency from the incident beam to the waveguide is low (<20%).

To increase coupling efficiency, a highly reflective layer/mask, called a mirror, can be used to reflect the beam transmitted through the grating and waveguide back into the grating region. However, some assemblies employed to increase coupling efficiency require many layers, which increases the fabrication cost of the device.

SUMMARY

The present invention relates to an optical waveguide including a core guiding layer, a cladding layer adjacent to the core guiding layer a reflective layer, and a multiple layer stack between the cladding layer and the reflective layer. The multiple layer stack includes a periodic arrangement of dielectric bilayers that each include a first dielectric layer and a second dielectric layer. An index of refraction $n_1$ of the first dielectric layer is greater than an index of refraction $n_2$ the second dielectric layer.

In another aspect, the present invention relates to a magnetic recording apparatus including a write element for generating a write field and an optical device configured to deliver optical energy proximate the write field. The optical device includes a core guiding layer, a cladding layer adjacent to the core guiding layer, a reflective layer, and a multiple layer stack between the cladding layer and the reflective layer. The multiple layer stack includes a periodic arrangement of dielectric bilayers that each include a first dielectric layer and a second dielectric layer. An index of refraction $n_1$ of the first dielectric layer is greater than an index of refraction $n_2$ the second dielectric layer.

In a further aspect, the present invention relates to a magnetic recording system including a magnetic medium, a write element positioned adjacent to the magnetic medium for generating a write field at the magnetic medium, and an optical waveguide for delivering optical energy to heat a portion of the magnetic medium proximate the write field. The optical waveguide includes a core guiding layer, a cladding layer adjacent to the core guiding layer, a reflective layer, and a multiple layer stack between the cladding layer and the reflective layer. The multiple layer stack includes a periodic arrangement of dielectric bilayers that each include a first dielectric layer and a second dielectric layer. An index of refraction $n_1$ of the first dielectric layer is greater than an index of refraction $n_2$ the second dielectric layer.

The above summary of the present invention is not intended to describe each disclosed embodiment or every implementation of the present invention. The figures and the detailed description which follow more particularly exemplify illustrative embodiments.

While some of the above-identified figures set forth one or more embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. It should also be understood that the above-identified figures are not drawn to scale.

DETAILED DESCRIPTION

Figure 1:
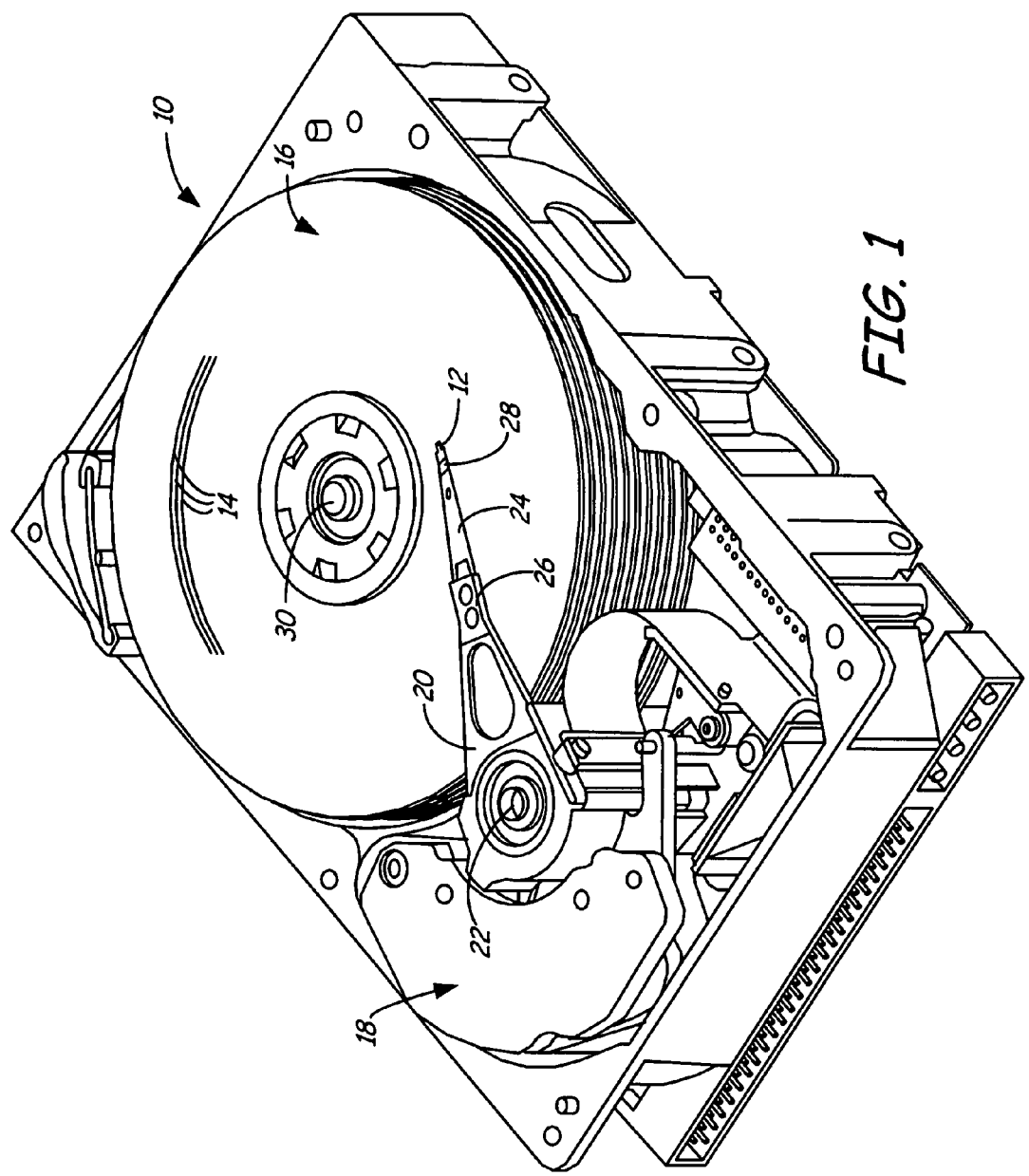
FIG. 1 is a perspective view of a magnetic recording system.

FIG. 1 is a perspective view of a disc drive 10 including an actuation system for positioning slider 12 over track 14 of magnetic medium 16. The particular configuration of disc drive 10 is shown for ease of describing the present invention and is not intended to limit the scope of the present invention in any way. Disc drive 10 includes a voice coil motor (VCM) 18 arranged to rotate an actuator arm 20 on a spindle around an axis 22. A load beam 24 is connected to actuator arm 20 at a head mounting block 26. A suspension 28 is connected to an end of load beam 24 and slider 12 is attached to suspension 28. VCM 18 is regulated by a controller that is not shown in this view and is well known in the art. Magnetic medium 16 rotates around an axis 30, so that windage is encountered by slider 12 to keep it aloft a small distance above the surface of magnetic medium 16. Each track 14 of magnetic medium 16 is formatted with an array of data storage cells for storing data. Slider 12 carries a magnetic transducer (not shown in FIG. 1) for reading and/or writing data on tracks 14 of magnetic medium 16. The magnetic transducer is described in more detail by way of examples in the following figures.

Figure 2:
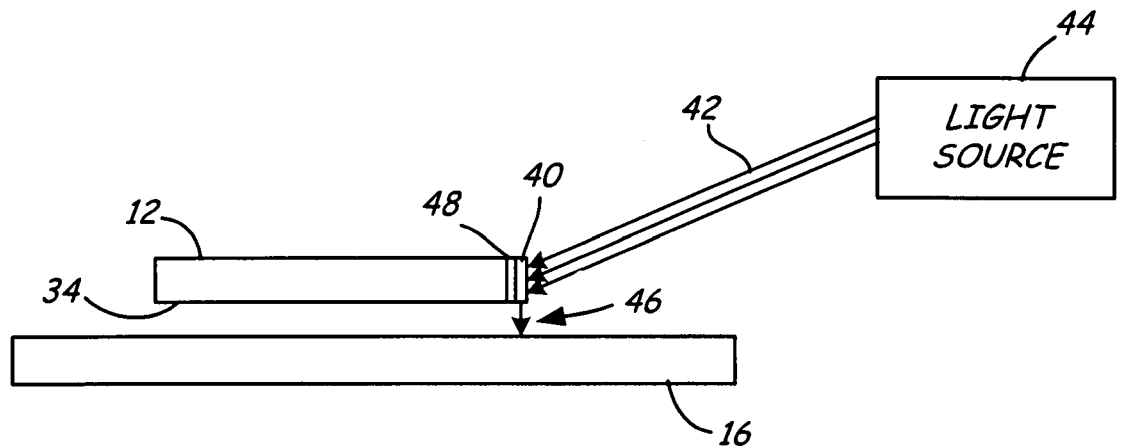
FIG. 2 is a side view of a slider including a planar optical waveguide for heating a portion of a magnetic medium.

FIG. 2 is a side view of slider 12 including medium confronting surface 34 positioned adjacent to magnetic medium 16. Waveguide 40 is mounted at one end of slider 12. Light illustrated by rays 42 is supplied by light source 44 and is directed onto waveguide 40. Light source 44 may be a coherent source of electromagnetic radiation, such as a laser. The light provided by light source 44 may be, for example, visible, infrared, or ultraviolet light. Light is coupled into waveguide 40 from free space, which includes a wave vector component directed toward magnetic medium 16 below slider 12. The light is focused by waveguide 40 onto magnetic medium 16 as illustrated by arrow 46 for localized heating in assisting magnetic recording to more readily write information to magnetic medium 16. Magnetic write element 48 can be positioned adjacent to waveguide 40 to provide a magnetic write field to write data to magnetic medium 16.

Figure 3:
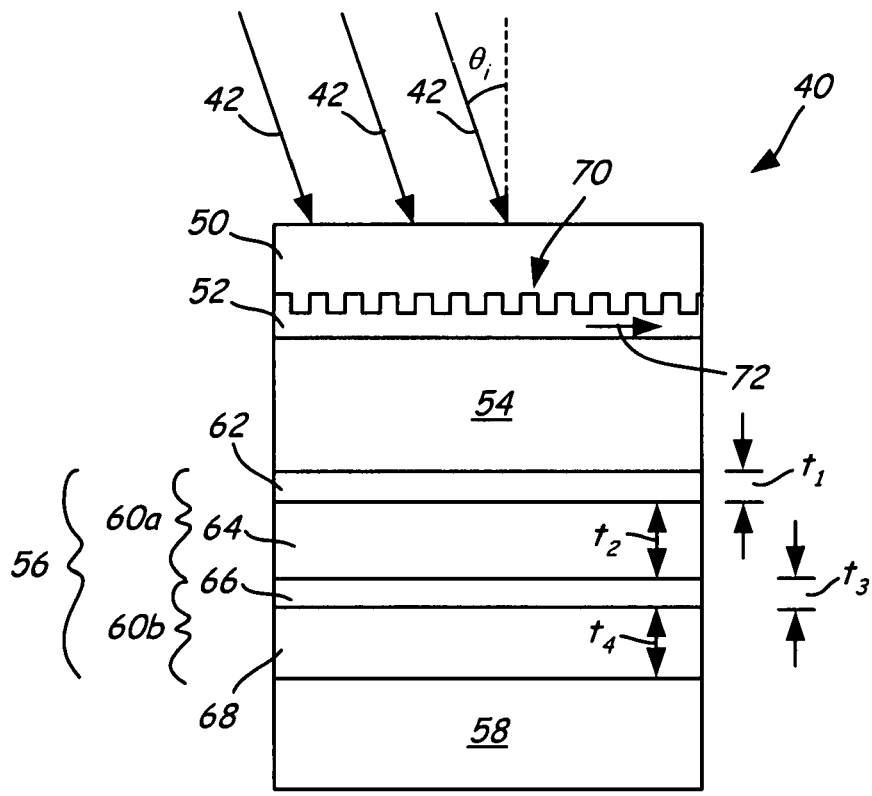
FIG. 3 is a layer diagram of the planar optical waveguide including a multiple layer stack portion for improving optical coupling efficiency.

FIG. 3 is a layer diagram of waveguide 40 including overcoat layer 50, core guiding layer 52, cladding layer 54, multiple layer stack 56, and reflective layer 58. Multiple layer stack 56 includes a periodic arrangement of dielectric bilayers, including first dielectric bilayer 60a and second dielectric bilayer 60b. First dielectric bilayer 60a includes first dielectric layer 62 and second dielectric layer 64, and second dielectric bilayer 60b includes first dielectric layer 66 and second dielectric layer 68. Core guiding layer 52 is between overcoat layer 50 and cladding layer 54, and multiple layer stack 56 is between cladding layer 54 and reflective layer 58.

Grating 70 is formed at the interface between overcoat layer 50 and core guiding layer 52. Grating 70 includes periodic grooves or ridges formed in or near core guiding layer 52. In alternative embodiments, periodic grooves or ridges are formed at the interface between core guiding layer 52 and cladding layer 54. In some embodiments, the periodic grooves or ridges have a duty cycle of about 50% (i.e., the widths of the peaks and valleys are about equal). In the embodiment shown, the profile of the grooves or ridges of grating 70 is rectangular, but it will be understood that the grooves or ridges can have other shapes, including sinusoidal or blazed profiles.

First dielectric layers 62 and 66 are comprised of a material having an index of refraction $n_1$, and second dielectric layers 64 and 68 are comprised of a material having an index of refraction $n_2$. Index of refraction $n_1$ is greater than index of refraction $n_2$ ($n_1 > n_2$). In some embodiments, core guiding layer 52 is comprised of the same material and/or a material having the same index of refraction $n_1$ as first dielectric layers 62 and 66, and overcoat layer 50 and cladding layer 54 are comprised of the same material and/or a material having the same index of refraction $n_2$ as second dielectric layers 64 and 68. Reflective layer 58 is comprised of an optically reflective metallic material, such as Al, Ag, Au, or Cu.

In operation, a coherent beam of polarized light from light source 44, illustrated as light rays 42, is incident on a planar upper surface of waveguide 40 at angle $\theta_i$. Light rays 42 pass through a medium of incidence having an index of refraction of $n_0$ prior to reaching waveguide 40. Light source 44 is positioned relative to waveguide 40 to provide light at angle $\theta_i$ based on the depth, period, and duty of the grooves in grating 70, for example. A portion of light rays 42 is incident on grating 70. The remaining light rays 42 pass through cladding layer 54 and multiple stack portion 56, through which the light is refracted based on the indices of refraction of each of the layers. The light is then reflected by reflective layer 58 back toward grating 70 of core guiding layer 52. When light rays 42 from light source 44 and light rays reflected by reflective layer 58 intersect at grating 70, light is launched into core guiding layer 52, and a waveguide mode is excited in core guiding layer 52, illustrated as arrow 72. Light from excited waveguide mode 72 is provided from medium confronting surface 34 for heating of magnetic medium 16, as illustrated by arrow 46 in FIG. 2.

The light that is launched into core guiding layer 52 is affected by the amount of light that is reflected by reflective layer 58. Consequently, in order to maximize the coupling efficiency of light launched by grating 70 into core guiding layer 52, the light reflected by reflective layer 58 should be maximized. One way to obtain high reflection is to incorporate multiple layer stack 56 between reflective layer 58 and cladding layer 54. The thicknesses of layers 62, 64, 66, and 68 may be set to affect the amount of light that passes through multiple layer stack 56. In some embodiments, first dielectric layers 62 and 66, which each have a high index of refraction $n_1$, have respective thicknesses $t_1$ and $t_3$ of $$t_1 = t_3 = \frac{0.5\lambda}{2\sqrt{n_1^2 - n_0^2 \sin^2 \theta_i}},$$

and second dielectric layer 64, which has an index of refraction $n_2$, has a thickness $t_2$ of $$t_2 = \frac{0.5\lambda}{2\sqrt{n_2^2 - n_0^2 \sin^2 \theta_i}},$$

where $\lambda$ is the wavelength of the light from light source 44 and $n_0$ is the index of refraction of the medium of incidence. Additional dielectric bilayers 60a having thicknesses as described may be provided between cladding layer 54 and reflective layer 58. In some embodiments, one to ten dielectric bilayers 60a are formed in multiple layer stack 56. Dielectric layer 68, the layer of multiple layer stack 56 most proximate reflective layer 58, has a thickness $t_4$ that yields the highest reflection from reflective layer 58 when light is incident on multiple layer stack 56 from cladding layer 54. Thickness $t_4$ may be determined by simulation or modeling techniques, for example.

To test the effect of incorporating multiple layer stack 56 on the reflectivity of reflective layer 58, optical waveguide 40 as shown in FIG. 3 was simulated. Core guiding layer 52 and dielectric layers 62 and 66 were comprised of $Ta_2O_5$ having an index of refraction $n_1$ of 2.25. Overcoat layer 50, cladding layer 54, and dielectric layers 64 and 68 were comprised of $Al_2O_3$ having an index of refraction $n_2$ of 1.67. Reflective layer 58 was comprised of Al having an index of refraction of $0.695+5.80i$. The wavelength $\lambda$ of light rays 42 was 488 nm. Core guiding layer 52 was 85 nm thick, and grooves having a rectangular profile were etched into core guiding layer 52. Grating 70 had a period of 325 nm with a 50% duty cycle. The optimal angle of incidence for efficient optical coupling into core guiding layer was calculated to be about 21°-22°, depending on the depth of the grooves of grating 70. The incident beam was a linearly polarized Gaussian beam having a full width of 100$\lambda$ at its $1/e^2$ intensity point at its waist, and the only excited waveguide mode was the zero-order transverse electric mode ($TE_0$). Dielectric layers 62 and 66 had respective thicknesses $t_1$ and $t_3$ of 55 nm, and dielectric layer 64 had a thickness $t_2$ of 75 nm. Simulation results showed that the thickness $t_4$ of dielectric layer 68 that maximized the reflectivity of reflective layer 58 was 62 nm. In optical waveguide 40 having these characteristics, the reflectivity of reflective layer 58 was 96%, compared to 87% for an optical waveguide not including multiple layer stack 56.

Figure 4:
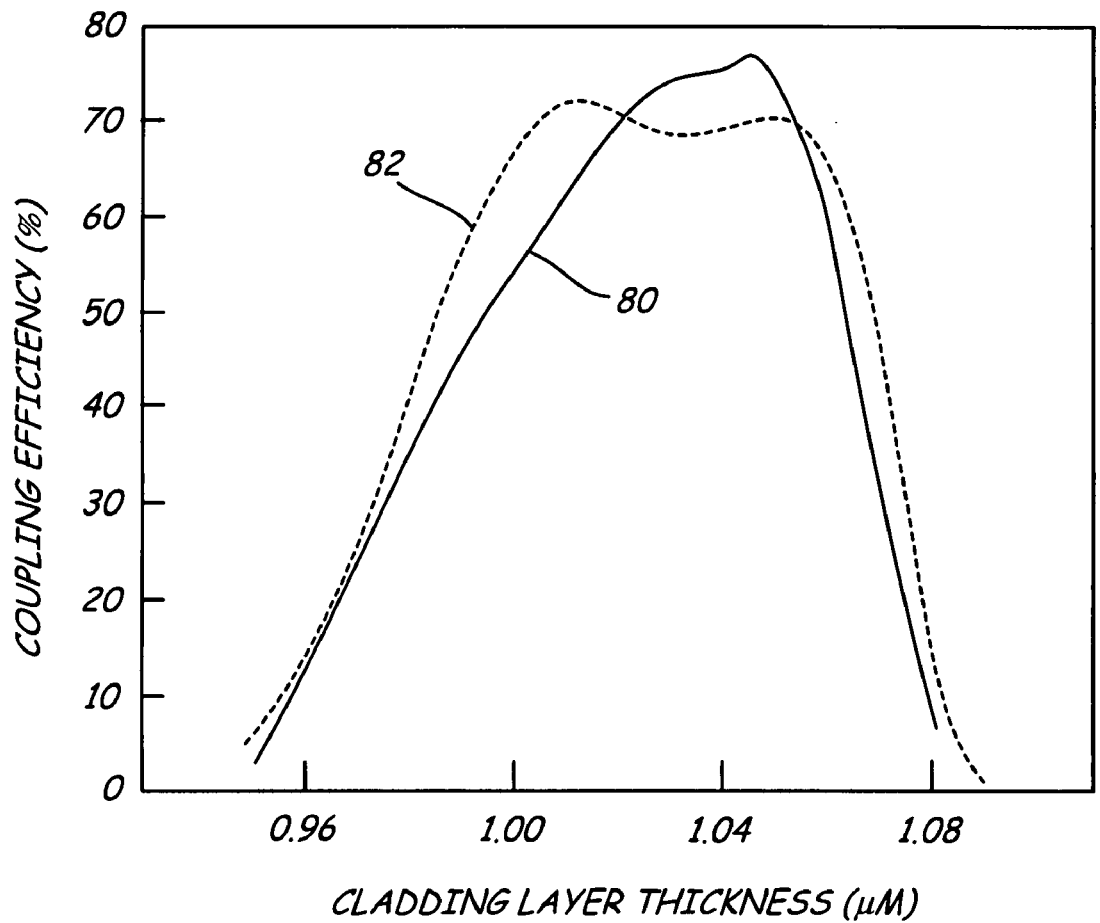
FIG. 4 is a graph showing the coupling efficiency versus cladding layer thickness of the planar optical waveguide.

FIG. 4 is a graph of the grating coupling efficiency as a function of the thickness of cladding layer 54 for the optical waveguide having characteristics described above. The coupling efficiency is the percentage of the incident light from light source 44 that is coupled by optical waveguide 40. Line 80 shows the grating coupling efficiency for grating 70 including grooves having a depth of 20 nm, and line 82 shows the grating coupling efficiency for grating 70 including grooves having a depth of 25 nm. The maximum optical coupling efficiency illustrated by line 80 is about 75% and the maximum optical coupling efficiency illustrated by line 82 is about 72%. For comparative purposes, a similar device without multiple layer stack 56 has a coupling efficiency of about 65%. In addition, the theoretical upper limit for in-phase optical coupling efficiency in a grating 70 with uniform grooves and Gaussian beam incidence if 81%, so an optical waveguide 40 including multiple layer stack 56 approaches this theoretical upper limit of coupling efficiency.

In summary, the present invention relates to an optical waveguide including a core guiding layer, a cladding layer adjacent to the core guiding layer a reflective layer, and a multiple layer stack between the cladding layer and the reflective layer. The multiple layer stack includes a periodic arrangement of dielectric bilayers that each include a first dielectric layer and a second dielectric layer. An index of refraction $n_1$ of the first dielectric layer is greater than an index of refraction $n_2$ the second dielectric layer. With the multiple layer stack incorporated into the optical waveguide, the reflectivity of the reflective layer is increased to nearly 100% and the coupling efficiency of the optical waveguide is significantly improved. As a result, the optical waveguide can produce higher intensity optical energy from the core layer, which may be employed to generate greater heating of the medium in heat assisted magnetic (HAMR) recording applications.

Although the present invention has been described with reference to preferred embodiments, workers skilled in the art will recognize that changes may be made in form and detail without departing from the spirit and scope of the invention.

The invention claimed is:

1. An optical waveguide comprising:
a core guiding layer;
a grating adjacent to the core guiding layer to launch light rays into the core layer, wherein light rays received by the grating include a first portion incident to the grating and a second portion to pass through the grating;
a cladding layer for the second portion of light rays to pass through; and
a reflective structure including a reflective layer and a multiple layer stack on the reflective layer, wherein the multiple layer stack includes a periodic arrangement of dielectric bilayers that each include a first dielectric layer and a second dielectric layer, wherein an index of refraction $n_1$ of the first dielectric layer is greater than an index of refraction $n_2$ of the second dielectric layer.

2. An optical waveguide, comprising:
a core guiding layer;
a cladding layer adjacent to the core guiding layer;
a reflective layer; and
a multiple layer stack between the reflective layer and the cladding layer, wherein the multiple layer stack includes a periodic arrangement of dielectric bilayers that each include a first dielectric layer and a second dielectric layer, wherein an index of refraction $n_1$ of the first dielectric layer is greater than an index of refraction $n_2$ of the second dielectric layer; and
wherein, for all layers of the multiple layer stack except a layer adjacent the reflective layer, the first dielectric layer has a thickness of $$\frac{0.5\lambda}{2\sqrt{n_1^2 - n_0^2 \sin^2 \theta_i}}$$

and the second dielectric layer has a thickness of $$\frac{0.5\lambda}{2\sqrt{n_2^2 - n_0^2 \sin^2 \theta_i}}$$

for light having a wavelength $\lambda$ that is incident on a planar upper surface of the optical waveguide at an angle $\theta_i$ through a medium of incidence having an index of refraction $n_0$.

3. The optical waveguide of claim 1, wherein the first dielectric layer is comprised of the same material as the core guiding layer.

4. The optical waveguide of claim 1, wherein the second dielectric layer is comprised of the same material as the cladding layer.

5. The optical waveguide of claim 1, wherein the periodic arrangement of dielectric bilayers comprises between one and ten dielectric bilayers.

6. The optical waveguide of claim 1, wherein the grating comprises a plurality of rectangular grooves in the core guiding layer.

7. The optical waveguide of claim 1, and further comprising:
an overcoat layer adjacent to the core guiding layer on a side opposite the cladding layer.

8. A magnetic recording apparatus comprising:
a write element for generating a write field; and
an optical device configured to deliver optical energy proximate the write field, wherein the optical device comprises a core guiding layer for providing light in an excited waveguide mode, a cladding layer adjacent to the core guiding layer, a reflective structure with a reflective layer, and a multiple layer stack between the reflective layer and the cladding layer, wherein the multiple layer stack includes a periodic arrangement of dielectric bilayers that each include a first dielectric layer and a second dielectric layer, wherein an index of refraction $n_1$ of the first dielectric layer is greater than an index of refraction $n_2$ of the second dielectric layer, and a grating to launch light into the core guiding layer by coupling a first portion of light received that is incident to the grating with a second portion of light received that passes through the grating and is reflected by the reflective structure.

9. A magnetic recording apparatus comprising:
a write element for generating a write field; and
an optical device configured to deliver optical energy proximate the write field, wherein the optical device comprises a core guiding layer, a cladding layer adjacent to the core guiding layer, a reflective layer, and a multiple layer stack between the reflective layer and the cladding layer, wherein the multiple layer stack includes a periodic arrangement of dielectric bilayers that each include a first dielectric layer and a second dielectric layer, wherein an index of refraction $n_1$ of the first dielectric layer is greater than an index of refraction $n_2$ of the second dielectric layer;
wherein, for all layers of the multiple layer stack except a layer adjacent the reflective layer, the first dielectric layer has a thickness of $$\frac{0.5\lambda}{2\sqrt{n_1^2 - n_0^2 \sin^2 \theta_i}}$$

and the second dielectric layer has a thickness of $$\frac{0.5\lambda}{2\sqrt{n_2^2 - n_0^2 \sin^2 \theta_i}}$$

for light having a wavelength $\lambda$ that is incident on a planar upper surface of the optical waveguide at an angle $\theta_i$ through a medium of incidence having an index of refraction $n_0$.

10. The magnetic recording apparatus of claim 8, wherein the first dielectric layer is comprised of the same material as the core guiding layer.

11. The magnetic recording apparatus of claim 8, wherein the second dielectric layer is comprised of the same material as the cladding layer.

12. The magnetic recording apparatus of claim 8, wherein the periodic arrangement of dielectric bilayers comprises between one and ten dielectric bilayers.

13. The magnetic recording apparatus of claim 8, wherein the grating comprises a plurality of rectangular grooves in the core guiding layer.

14. The magnetic recording apparatus of claim 8, and further comprising:
an overcoat layer adjacent to the core guiding layer on a side opposite the cladding layer.

15. A magnetic recording system comprising:
a magnetic medium;
a write element for generating a write field at the magnetic medium; and
an optical waveguide for delivering optical energy to heat a portion of the magnetic medium proximate the write field, wherein the optical waveguide comprises a core guiding layer for providing light in an excited waveguide mode, a cladding layer adjacent to the core guiding layer, a reflective structure with a reflective layer and a multiple layer stack between the reflective layer and the cladding layer, wherein the multiple layer stack includes a periodic arrangement of dielectric bilayers that each include a first dielectric layer and a second dielectric layer, wherein an index of refraction $n_1$ of the first dielectric layer is greater than an index of refraction $n_2$ of the second dielectric layer, and a grating to launch light into the core guiding layer by coupling a first portion of light received that is incident to the grating with a second portion of light received that passes through the grating and is reflected by the reflective structure.

16. A magnetic recording system comprising:
a magnetic medium;
a write element for generating a write field at the magnetic medium; and
an optical waveguide for delivering optical energy to heat a portion of the magnetic medium proximate the write field, wherein the optical waveguide comprises a core guiding layer, a cladding layer adjacent to the core guiding layer, a reflective layer, and a multiple layer stack between the cladding layer and the reflective layer, wherein the multiple layer stack includes a periodic arrangement of dielectric bilayers that each include a first dielectric layer and a second dielectric layer, wherein an index of refraction $n_1$ of the first dielectric layer is greater than an index of refraction $n_2$ of the second dielectric layer;
wherein, for all layers of the multiple layer stack except a layer adjacent the reflective layer, the first dielectric layer has a thickness of $$\frac{0.5\lambda}{2\sqrt{n_1^2 - n_0^2 \sin^2 \theta_i}}$$

and the second dielectric layer has a thickness of $$\frac{0.5\lambda}{2\sqrt{n_2^2 - n_0^2 \sin^2 \theta_i}}$$

for light having a wavelength $\lambda$ that is incident on a planar upper surface the optical waveguide at an angle $\theta_i$ through a medium of incidence having an index of refraction $n_0$.

17. The magnetic recording system of claim 15, wherein the first dielectric layer is comprised of the same material as the core guiding layer.

18. The magnetic recording system of claim 15, wherein the second dielectric layer is comprised of the same material as the cladding layer.

19. The magnetic recording system of claim 15, wherein the periodic arrangement of dielectric bilayers comprises between one and ten dielectric bilayers.

* * * * *